US009891860B1

(12) United States Patent
Delgado et al.

(10) Patent No.: US 9,891,860 B1
(45) Date of Patent: Feb. 13, 2018

(54) MANAGING COPYING OF DATA IN STORAGE SYSTEMS

(71) Applicant: EMC Corporation, Hopkinton, MA (US)

(72) Inventors: Diane M. Delgado, Carlisle, MA (US); Lawrence Yetto, Mont Vernon, NH (US); Christopher Seibel, Walpole, MA (US); John F. Gillono, North Chelmsford, MA (US); Philippe Armangau, Acton, MA (US); Alexei Karaban, Southborough, MA (US)

(73) Assignee: EMC IP Holding Company, LLC., Hopkinton, MA (US)

( * ) Notice: Subject to any disclaimer, the term of this patent is extended or adjusted under 35 U.S.C. 154(b) by 363 days.

(21) Appl. No.: 13/930,337

(22) Filed: Jun. 28, 2013

(51) Int. Cl.
 *G06F 12/00* (2006.01)
 *G06F 3/06* (2006.01)

(52) U.S. Cl.
 CPC ............ *G06F 3/065* (2013.01); *G06F 3/0614* (2013.01); *G06F 3/0641* (2013.01); *G06F 3/0689* (2013.01)

(58) Field of Classification Search
 CPC ...... G06F 3/065; G06F 3/0614; G06F 3/0689; G06F 3/0641
 See application file for complete search history.

(56) References Cited

U.S. PATENT DOCUMENTS

| 6,247,024 | B1 * | 6/2001 | Kincaid |
| 8,190,850 | B1 * | 5/2012 | Davenport et al. ........... 711/202 |
| 2010/0076934 | A1 * | 3/2010 | Pershin et al. ................ 707/640 |
| 2012/0017060 | A1 * | 1/2012 | Kapanipathi ......... G06F 3/0608 711/162 |
| 2013/0151802 | A1 * | 6/2013 | Bahadure et al. ............ 711/162 |
| 2014/0244599 | A1 * | 8/2014 | Zhang ................... G06F 3/0608 707/692 |

* cited by examiner

*Primary Examiner* — Reginald Bragdon
*Assistant Examiner* — Mehdi Namazi
(74) *Attorney, Agent, or Firm* — Krishnendu Gupta; Deepika Bhayana; Lesley A. Leonessa (57) ABSTRACT

A method is used in managing copying of data in storage systems. A request is received to copy a portion of a source logical object to a target logical object. The source and target logical objects are subject to a deduplicating technique. The portion of the source logical object is copied to the target logical object by updating metadata of the target logical object. The target logical object shares the portion of the source logical object.

14 Claims, 8 Drawing Sheets

MANAGING COPYING OF DATA IN STORAGE SYSTEMS

BACKGROUND

Technical Field

This application relates to managing copying of data in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, and timestamps) about that file.

The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in a hierarchy depending upon the size of a file where each level of indirect blocks includes pointers to indirect blocks at the next lower level. An indirect block at the lowest level of the hierarchy is known as a leaf indirect block.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file.

Deduplication is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

SUMMARY OF THE INVENTION

A method is used in managing copying of data in storage systems. A request is received to copy a portion of a source logical object to a target logical object. The source and target logical objects are subject to a deduplicating technique. The portion of the source logical object is copied to the target logical object by updating metadata of the target logical object. The target logical object shares the portion of the source logical object.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in managing copying of data in storage systems, which technique may be used to provide, among other things, receiving a request to copy a portion of a source logical object to a target logical object, where the source and target logical objects are subject to a deduplicating technique, and performing copy of the portion of the source logical object to the target logical object by updating metadata of the target logical object, where the target logical object shares the portion of the source logical object.

Generally, a storage extent is a logical contiguous area of storage reserved for a user requesting the storage space. A storage extent may include a set of disks having different RAID levels. A disk may be a physical disk within the storage system. A LUN may be a logical unit number which is an identifier for a logical unit representing a portion of disk storage. Each slice of data may have a mapping to the location of the physical drive where it starts and ends. A LUN presented to a host system may be organized as a file system by a file system mapping logic of a storage system.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

Typically, data deduplication is a process by which a data storage system can detect multiple identical copies of data and only keeps a single copy of that data, thus eliminating the redundant data by removing other copies of that data and thus improving storage utilization. A typical deduplication technique requires iterating over set of data blocks in one or more storage extents, finding the blocks that contain identical information by processing digest information associated with each block and mapping the identical blocks to a single copy of the data. In such systems, an index table of unique digests is created to find commonality among the data set.

In a conventional system, a copy command (e.g., "xcopy command received from a host") copies data from a source location of a source logical object to a target location of a target logical object. However, it should be noted that the source logical object may be same as the target logical object. Thus, typically, a copy (e.g., "xcopy") command may copy contents of a LUN to either the same LUN or a different LUN. In such a conventional system, when a storage system receives a copy command from a host system which is in communication with the storage system, the storage system performs copying of data of a source logical object to a target logical object by copying contents of data blocks corresponding to the data of the source logical object that is required to be copied by the copy command. In such a conventional system, when a typical deduplicating technique is applied on a source and target logical objects after a portion of the source logical object is copied to the target logical object as a result of completion of a copy command by a host, the deduplicating technique detects that the portion of source and target logical objects are identical. As a result, in such a conventional system, the identical portions of the source and logical objects are deduplicated to each other by deduplicating source data blocks to target data blocks thereby making the effort to copy the portion of the source logical object to the target logical object redundant. Thus, in such a conventional system, if source and target logical objects are subject to a deduplicating technique, data blocks of the source logical object that are copied to the target logical object as part of a copy operation are shared with each other when the deduplicating technique performs deduplication which keeps one copy of the identical portion and deletes the other identical copy.

By contrast, in at least some implementations in accordance with the technique as described herein, the current technique uses a logic same or similar to a deduplication logic for performing a copy operation such that a portion of a source logical object selected by the copy operation is shared with a target logical object by using the logic same or similar to the deduplication logic instead of copying contents of the portion of the source logical object to the target logical object. Thus, in at least one embodiment of the current technique, a copy operation is performed by updating metadata of source and target logical objects without having to copy contents of a portion of the source logical object to the target logical object. Thus, in at least one embodiment of the current technique, after a copy command is performed on a portion of a source logical object for copying the portion of the source logical object to a target logical object, the portion of the source logical object becomes deduplicated to the portion of the target logical object. Thus, in at least one embodiment of the current technique, a copy operation using the current technique skips copying contents of a source file to a target file upon receiving a copy command and instead deduplicate the contents of the source file to the target file by updating metadata of the target file without having to interact with a deduplication system thereby saving a large amount of processing performed during a conventional copy command and without having to perform deduplication processing operations such as creating an index entry and reading contents of data blocks for identifying identical contents. Thus, in at least one embodiment of the current technique, using logic same or similar to deduplication logic to perform a copy operation avoids copying a set of data blocks as the logic same or similar to the deduplication logic updates metadata of the set of data blocks instead of copying contents of the set of data blocks.

In at least some implementations in accordance with the current technique as described herein, the use of the managing copying of data in storage systems technique can provide one or more of the following advantages: improving efficiency of a data storage system by efficiently copying data of a source logical object to a target logical object by deduplicating data of the source logical object to the target logical object, improving performance of a copy command by skipping copying contents of a source logical object to a target logical object thereby reducing the amount of time required to copy the contents, optimizing a copy operation by reducing or eliminating the number of read and write operations associated with a conventional copy operation thereby reducing I/O load on a storage system, and improving a deduplication operation by reducing or eliminating the amount of time required to deduplicate data which has been copied from a source file to a target file.

Figure 1:
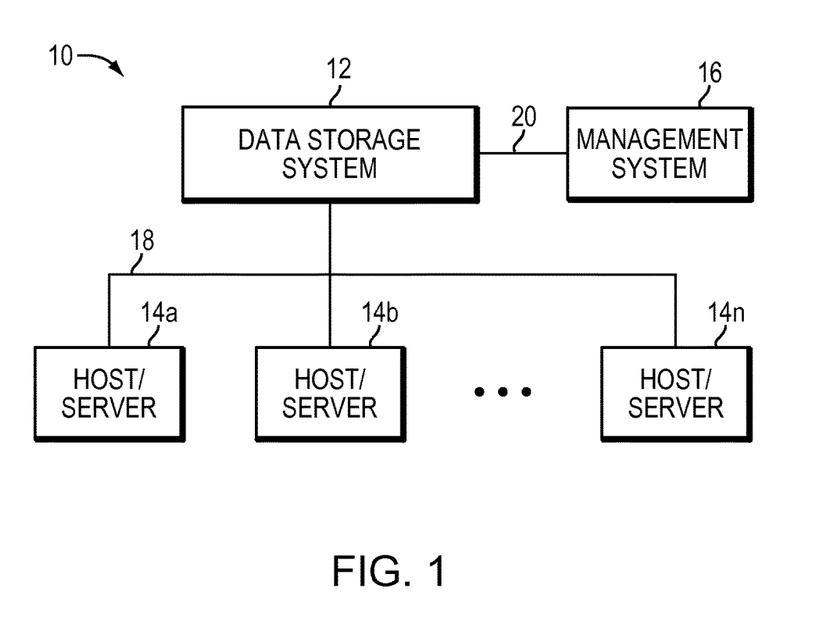
FIGS. 1-2 are examples of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
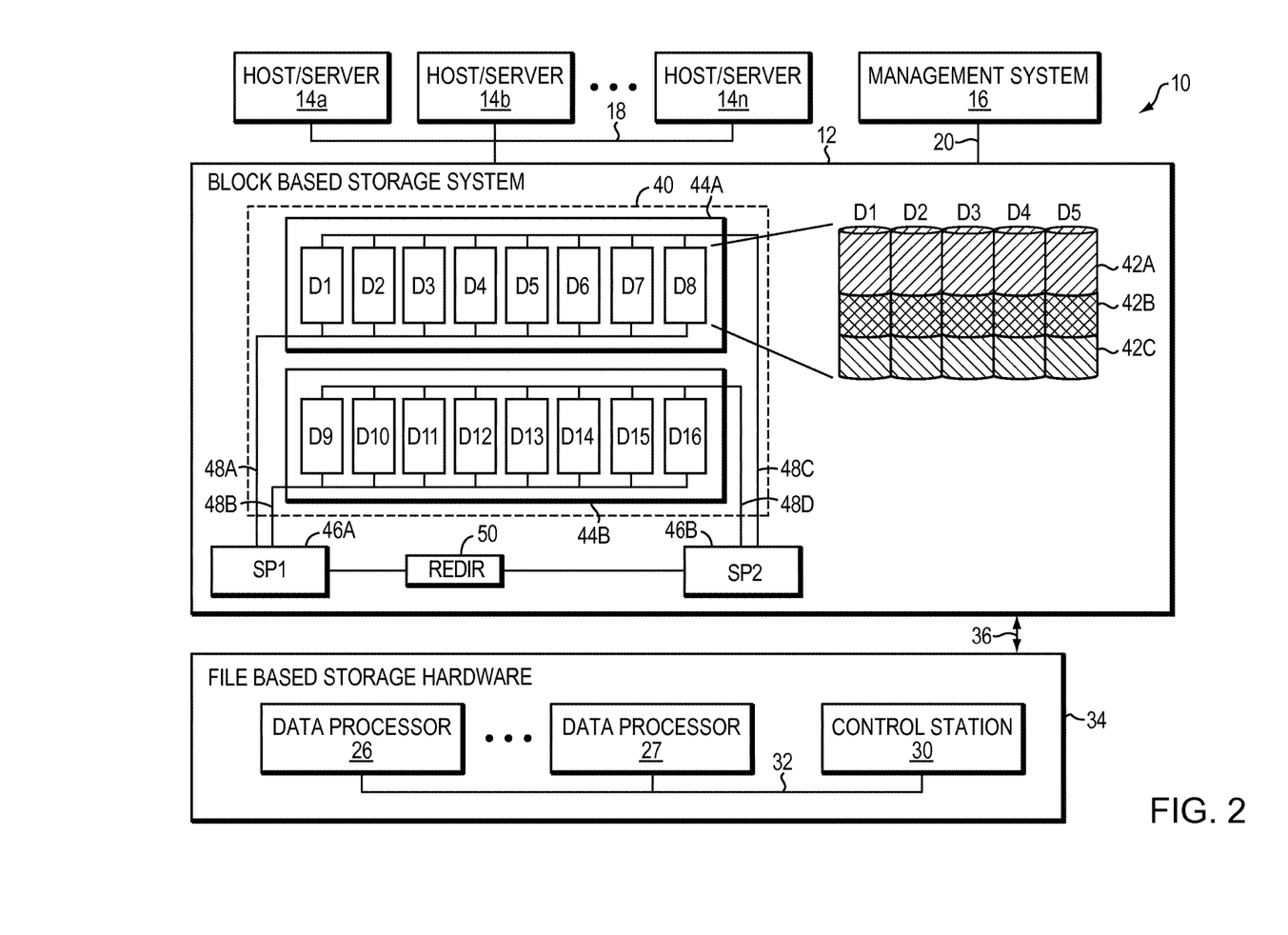

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
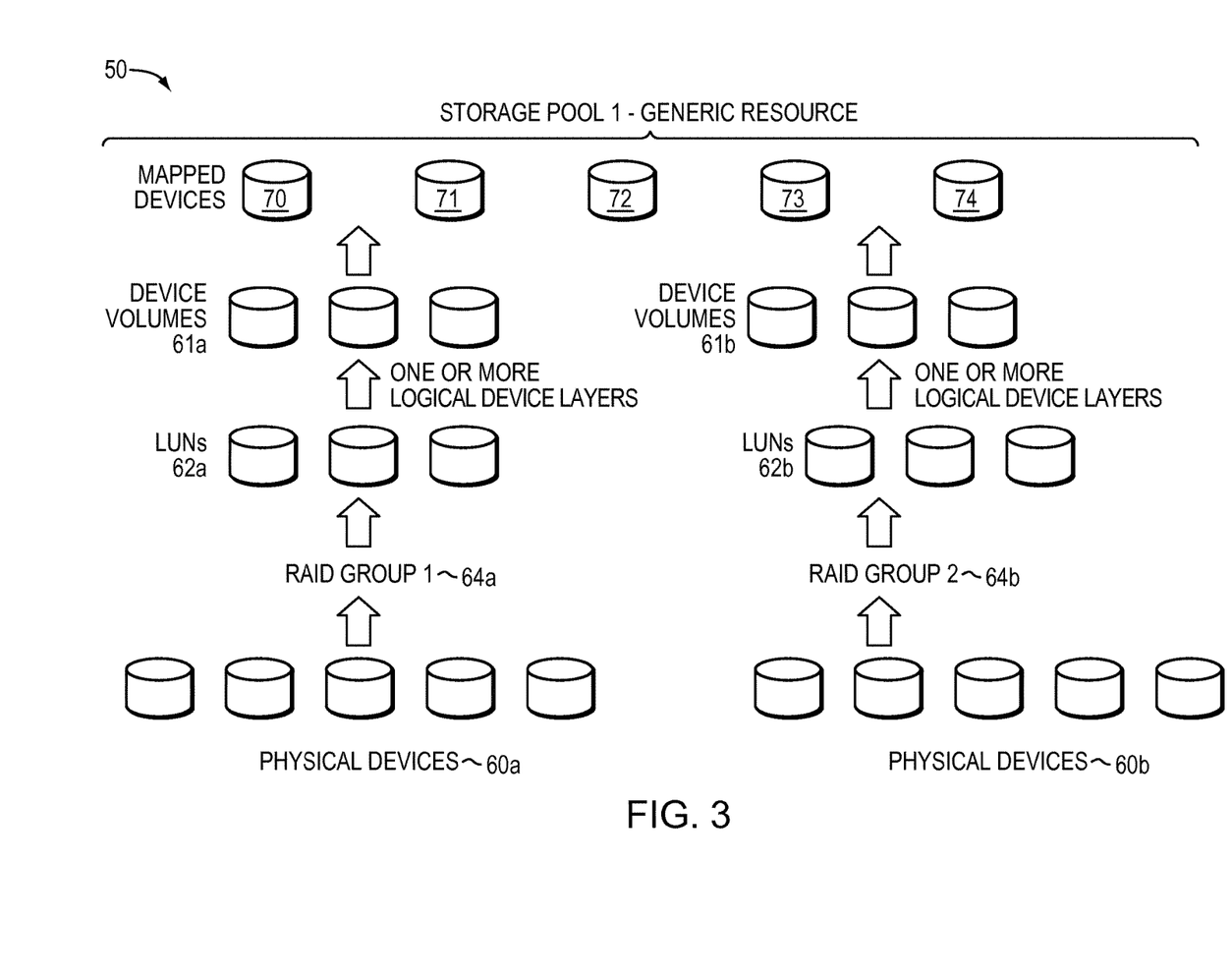
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4:
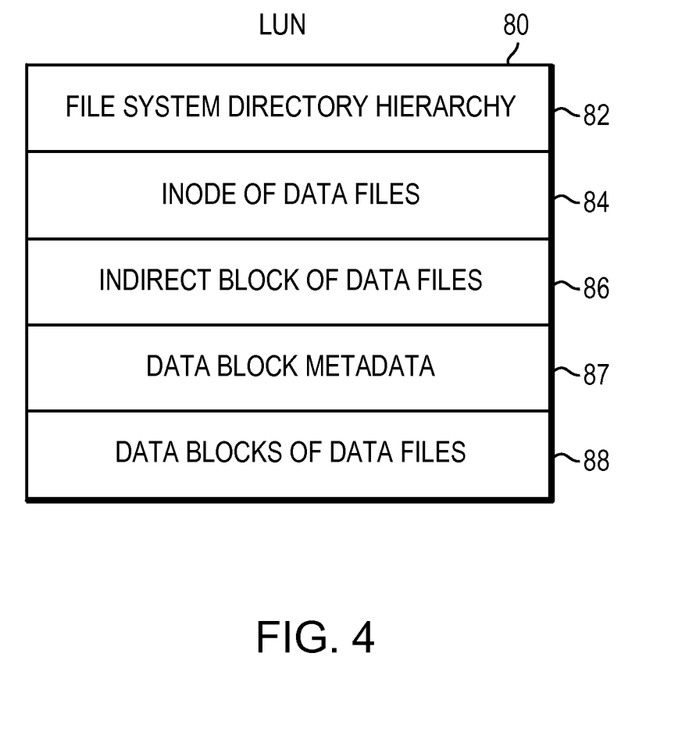
FIGS. 4-8 are diagrams illustrating in more detail components that may be used in connection with techniques herein.

Referring to FIG. 4, shown is a logical representation of a LUN presented to a host and organized as a file system that may be included in an embodiment using the techniques herein. A user of data storage system 12 access data from LUNs stored on disk drives 60 in fixed sized chunks. Each fixed size chunk is known as a slice. One or more slices are grouped together to create a slice pool. Host system 14 provisions storage from slice pools for creating LUNs. A LUN 80 is visible to host system 14 and a user of a data storage system 12. Typically, storage is allocated when host system 14 issues a write request and needs a data block to write user's data. File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 82 in the file system. Inodes of data files 84 depend from the file system directory hierarchy 82. Indirect blocks of data files 86 depend from the inodes of the data files 84. Data block metadata 87 and data blocks of data files 88 depend from the inodes of data files 84 and from the indirect blocks of data files 86.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block. However, it should be noted that a file system may be organized based on any one of the known mapping techniques such as an extent based binary tree mapping mechanism.

Figure 5:
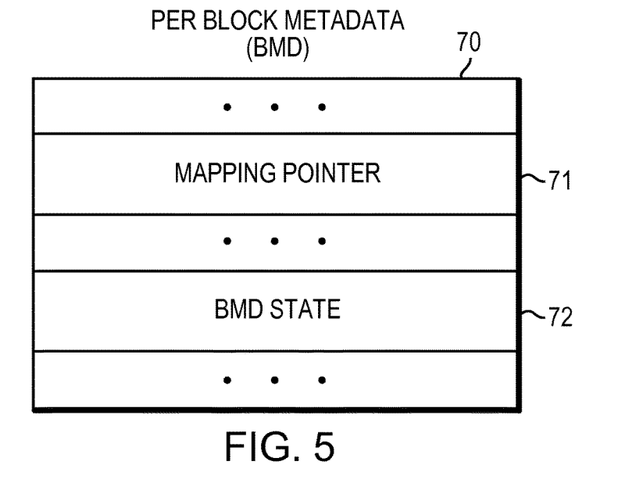

Referring to FIG. 5, shown is a representation of a per block metadata (also referred to as "BMD") for a file system data block that may be included in an embodiment using the techniques described herein. The per-block metadata 70 for a file system data block includes an inode number of a file of the file system, the file system data block number and the logical offset of the file system data block. The per-block metadata 70 for a file system data block also includes an internal checksum protecting the integrity of the information stored in the per-block metadata 70. The per-block metadata for a file system data block may further include a mapping pointer 71 and a data structure indicating state of the per-block metadata 72.

Figure 6:
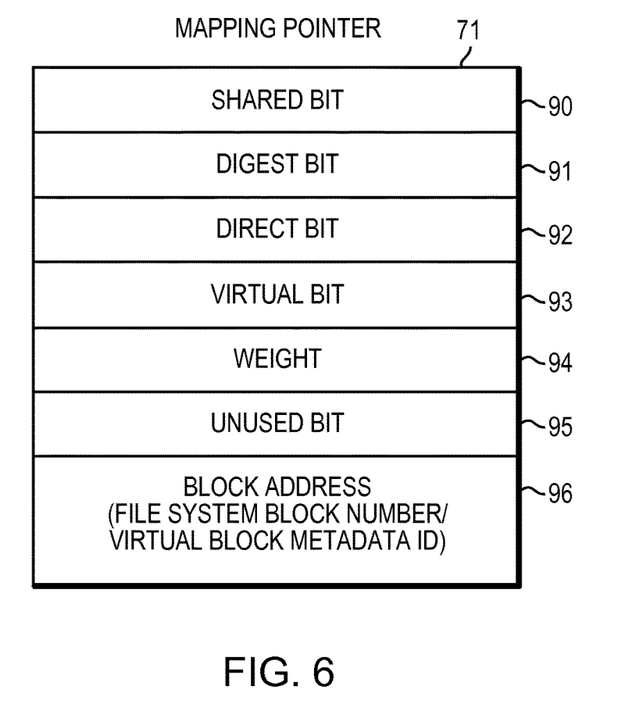

Referring to FIG. 6, shown is a representation of a mapping pointer 71 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block. Mapping pointer 71 includes metadata information such as shared bit 90, digest bit 91, direct bit 92, virtual bit 93, weight 94, unused bit 95 and block address 96. Shared bit 90 of mapping pointer 71 associated with a file system data block indicates whether the data block (or data blocks if the mapping pointer is associated with an indirect block) may be shared. Digest bit 91 of mapping pointer 71 for a file system block indicates whether the file system block has been digested by a deduplication engine. Direct bit 92 of mapping pointer 71 for a file system block indicates whether the physical address of the file system block can be computed algorithmically. Virtual bit 93 of mapping pointer 71 for a file system block indicates whether the mapping pointer is a virtual pointer. Weight 94 of mapping pointer 71 for a file system block indicates a delegated reference count for the mapping pointer 71. The delegated reference count is used by a snapshot copy facility when a replica of a file is created. Mapping pointers of the inode of the file are copied and included in the inode of the replica of the file. In at least one embodiment, mapping pointers of the inode may include mapping pointers pointing to direct data blocks and mapping pointers pointing to indirect data blocks. Then, the delegated reference count values stored in the mapping pointers of the file and the replica of the file are updated to indicate that the file and the replica of the file share data blocks of the file. Further, the delegated reference count may also be used by a deduplicating technique to deduplicate identical data blocks of a source and target logical objects. Unused bit 95 of mapping pointer 71 for a file system block indicates an unused space reserved for a future use. Block address 96 of mapping pointer 71 for a file system block indicates the block number of the file system block. Alternatively, block address 96 of mapping pointer 71 may indicate a Virtual Block Metadata ("VBM") identification number which points to a VBM object that points to a data block and includes metadata for the data block. Thus, VBM Id 96 is used to find an object including virtual block metadata. Thus, a VBM object includes file system data block mapping pointer as described in FIG. 6. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a client of a storage system to de-duplicate a file system block or to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers in inodes and indirect blocks pointing to the data blocks.

In at least one embodiment of the current technique, source and target data blocks are shared by updating VBM objects of the source and target data blocks such that at the completion of a copy operation, the VBM object of the target data block points to the VBM object of the source data block and shares contents of the source data block instead of copying contents of the source data block to the target data block. Thus, a portion of a LUN may be copied to another location on the same LUN or to a different LUN by updating VBM objects of a set of data blocks associated with the portion of the LUN on which a copy operation is performed.

Figure 7:
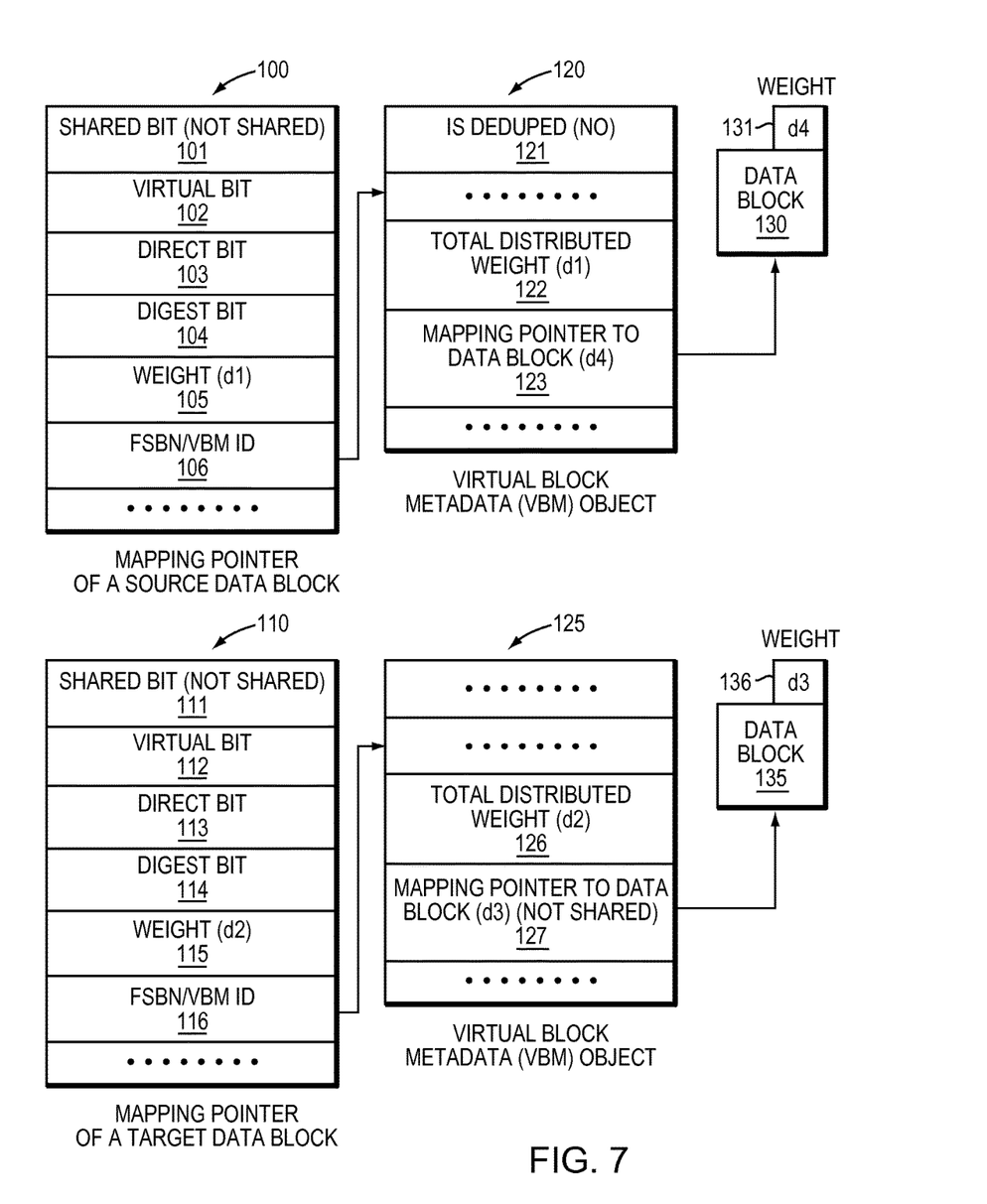

Referring to FIG. 7, shown is a more detailed representation of components that may be included in an embodiment using the techniques described herein. In at least one embodiment of the current technique, a request to copy data from a source LUN to a target LUN is received. A set of source and target data blocks may be associated with portions of the source and target LUNs selected for copying data. FIG. 7 shows mapping pointers 100, 110 for source and target data blocks that are selected for copying contents of the source data block 130 to the target data block 135. The mapping pointer 100 for the source data block 130 includes shared bit 101 indicating that the source data block has not been shared yet, virtual bit 102, direct bit 103, digest bit 104, delegated reference count (e.g., for illustration purposes a value denoted by "d1") 105 and VBM identification number 106 pointing to VBM object 120. The delegated reference count 105 value may be a specific number such as 20 or 1,000. The source data block 130 has associated per-block metadata including a reference count 131. The per-block metadata of the source data block 130, for example, may be organized as a table separate from the source data block 130 and indexed by the block number of the source data block 130.

The VBM object 120 includes metadata for data block 130 such as is de-duped field 121 indicating whether the data block 130 has been deduplicated, total distributed weight 122 indicating the sum of reference counts of data blocks referenced by the VBM object 120, and mapping pointer 123 to data block 130. For example, in FIG. 7, weight ("d1") 105 included in mapping pointer 100 and total distributed weight ("d1") 122 included in the VBM object 120 indicates that the VBM object 120 is owned by the mapping pointer 100. Similarly, weight ("d4") included in mapping pointer 123 of the VBM object 120 and weight ("d4") 131 included in per-block metadata of data block 130 indicates that the data block 130 is owned by the VBM object 120. Thus, in such a case, the data block 130 is owned by mapping pointer 100 by an indirect reference as each mapping pointer in the chain from mapping pointer 100 to data block 130 owns the object pointed to by respective mapping pointer.

The snapshot copy facility delegates a partial ownership interest to a snapshot copy when sharing occurs between a snapshot copy and a production file. The data de-duplication facility increments the reference count in the per-block metadata by a full-weight value when the data de-duplication facility causes sharing of the data block to occur within the same file or between entirely unrelated files.

Similarly, the mapping pointer 110 for the target data block 135 includes shared bit 111 indicating that the target data block has not been shared yet, virtual bit 112, direct bit 113, digest bit 114, delegated reference count (e.g., for illustration purposes a value denoted by "d2") 115 and VBM identification number 116 pointing to VBM object 125. The delegated reference count 115 value may be a specific number such as 20 or 1,000. The target data block 135 has associated per-block metadata including a reference count 136. The per-block metadata of the target data block 135, for example, is organized as a table separate from the target data block 135 and indexed by the block number of the target data block 135.

The VBM object 125 includes metadata for data block 135 such as total distributed weight 126 indicating the sum of reference counts of mapping pointers referenced by the VBM object 125, and mapping pointer 127 to data block 135. In the example of FIG. 7, the delegated reference count 115 has an initial full-weight value (e.g. d2 which may be, for example, 1000) and the reference count 136 in the per-block metadata of the target data block 135 also has an initial full-weight value (e.g. d3 which may be, for example, 1000). Further, weight ("d2") 115 matches with total distributed weight ("d2") 126 in the VBM object indicating that mapping pointer 110 owns the VBM object 125 which in turns own the data block 135 because of the matching weight values in mapping pointer 127 and data block 136.

Figure 8:
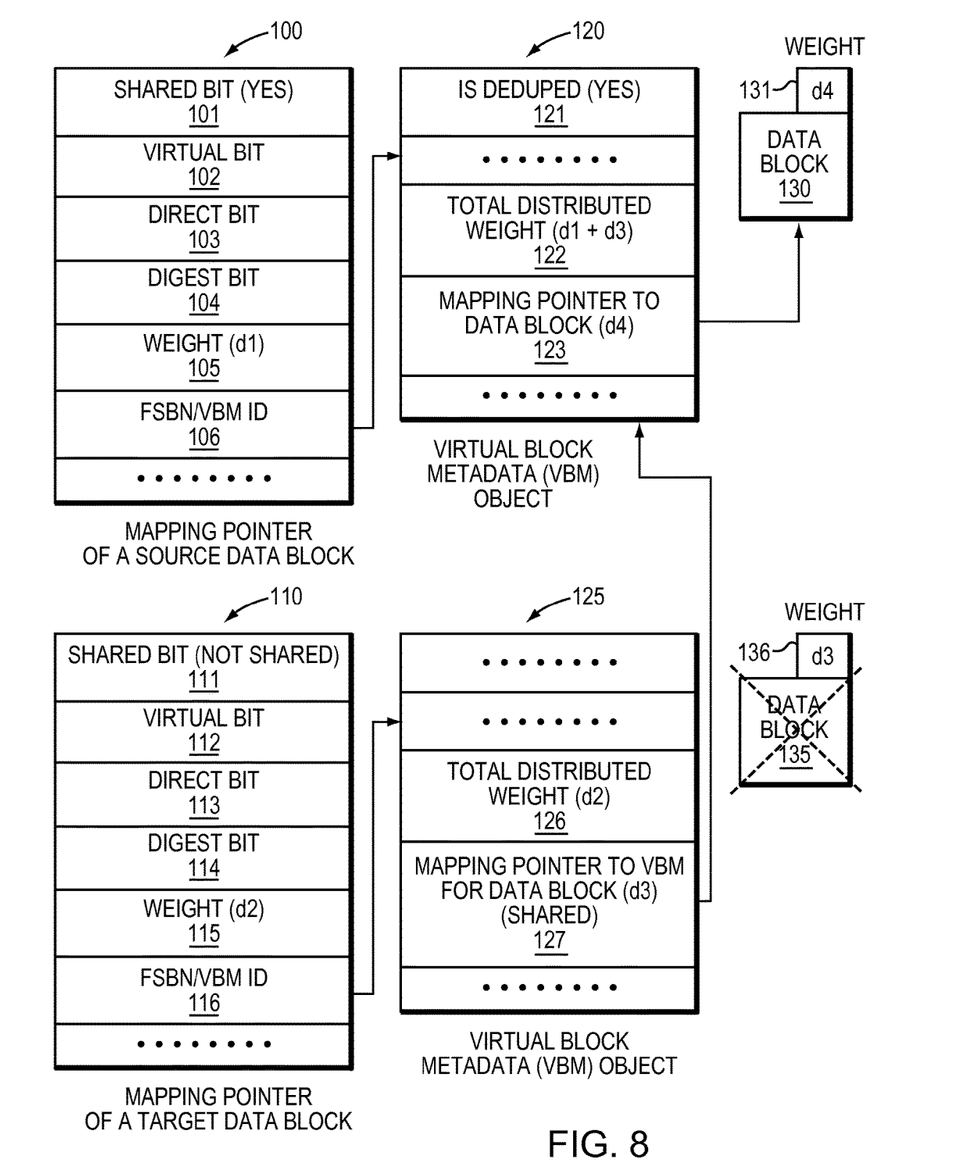

Referring to FIG. 8, shown is a more detailed representation of components that may be included in an embodiment using the techniques described herein. With reference also to FIG. 7, in at least one embodiment of the current technique, source data block 130 is copied to target data block 135 by updating metadata such as VBM objects 120, 125 and mapping pointer 127 using the delegated reference counting mechanism without having to copy contents of the source data block 130 to the target data block 135.

In order to perform copy of source data block 130 to target data block 135, the source data block 130 is shared by mapping pointer 100 of the source data block 130 and mapping pointer 110 of target data block 135. The sharing of the source data block 130 is performed by updating mapping pointer 127 in VBM object 125 for the target data block such that the mapping pointer 127 points to VBM object 120 for the source data block 130. Total distributed weight 122 for VBM object 120 for source data block 130 is incremented by total distributed weight value 126 in VBM object 125 of target data block 135 to indicate that VBM object 120 is now shared between mapping pointers 100, 110 of source and target data blocks 130, 135. The shared bit 101 of mapping pointer 100 for the source data block 130 is updated to indicate that contents of source data block 130 are now shared which further indicates that the VBM object 120 referenced by mapping pointer 100 is now shared by the mapping pointer 100 and VBM object 125. Further, is de-duped field 121 in VBM object 120 for source data block 130 is set to indicate that the source data block has been deduplicated to indicate that now identical data block (such as target data block 135) shares the source data block 130. Thus, metadata of source and target data blocks 130, 135 are updated in such a way as if a deduplicating technique has been applied to source and target data blocks 130, 135. Thus, if the deduplicating technique is later performed on source 130 and target data blocks 135, the deduplicating technique does not have to perform a deduplication operation as the source and target data blocks have already been deduplicated as a result of the copy operation. Thus, at the end of a copy operation to copy contents of a source logical object to a target logical object, the target logical object includes contents identical to the contents of the source logical object because the target logical object is deduplicated to the source logical object.

Thus, similarly to the data de-duplication facility, a copy operation using the current technique changes the mapping pointer 127 in the VBM object 125 for target data block 135 to point to VBM object 120 for the source data block 130, and increments the total distributed weight 122 in the VBM object 120 for the source data block 130 by reference count value (e.g. "d3") 136 of target data block 135. At the end of the copy operation, if the target data block 135 is not shared by any other mapping pointer for a file system block, the target data block 135 is freed. For example, in FIG. 8, at the end of the copy operation, VBM object 125 no longer points to data block 135. Thus, in such a case, the data block 135 is freed because the VBM object 125 that previously owned the data block 135 no longer points to the data block 135.

Thus, in at least one embodiment of the current technique, when a source data block is copied to a target data block using the current technique, the target data block results into being deduplicated to the source data block. If a target data block to which a copy operation is directed to have been shared by other data blocks, a write-spilt operation is performed on the target data block and then the target data block is deduplicated to the source data block thereby preserving sharing relationships for the other data blocks pointing to the target data block. In such a case, the write split operation includes allocating a new VBM object for the target data block and the new VBM object is updated to point to the VBM object for the source data block.

In at least one embodiment of the current technique, a file system mapping logic of a storage system provides a set of file system APIs (Application Programming Interfaces) for providing functionality of a copy operation by using logic same or similar to deduplication logic. An API such as a map-for-copy operation maps source and target non-overlapping storage extents (also referred to herein as "portions of storage") by using mapping pointers and VBM objects for copying the source storage extent to the target storage extent. The file system mapping driver checks whether storage extents selected for copying are aligned based on the size of a file system block configured on a storage extent (e.g. 8 Kilobytes (KB) file system block size). If storage extents selected for copying are not aligned based on the size of a file system block, the file system mapping driver may chose to trim the storage extents based on the size of a file system block and copy trimmed portions of the storage extents using the current technique. However, if source and target storage extents are misaligned with respect to each other, the file system mapping driver may chose not to copy the source storage extent to the target storage extent.

Generally, a write split operation based on the delegated reference counting mechanism is invoked upon receiving a write I/O request for a data block that has been shared. The write split operation evaluates the shared bit stored in the mapping pointer for a data block to check whether the data block has been shared after application of a snapshot copy facility or a deduplication facility. If the shared bit indicates that the data block has been shared among versions of a file or among two or more files, the write split operation breaks the sharing relationship of the data block and allocates a new data block for the write I/O request. If the mapping pointer that points to the data block resides in a shared indirect block, the sharing relationship of the indirect block is also broken. In such a case, the write split operation causes a new indirect block to be allocated and mapping pointers for all data blocks not involved in the write operation are copied to the new indirect block. The process of copying mapping pointers to the new indirect block includes distributing the delegated reference count values of mapping pointers between the original shared indirect block and the newly allocated indirect block. In addition to the distribution of the delegated reference count values, the shared bits of the copied mapping pointers are updated to indicate that the sharing relationship has been broken. Any reference to the old data block is released and the mapping pointer of the new data block is updated to point to the newly allocated data block. If the shared bit of the data block indicates that the data block has not been shared among versions of a file or among two or more files, contents of the data block are updated according to the write I/O request and the write I/O requests completes.

Generally, a copy operation may include a xcopy command based on a host communication protocol such as an iSCSI protocol and may be used to create virtual machines where a large number of virtual machines are configured by copying a virtual image to target locations. The current technique may be used on logical objects that are enabled for deduplication such that the logical objects may be subject to a deduplicating technique.

Typically, an xcopy command is received from a client of a storage system such that the client provides an offset within a source logical object and the length of data that needs to be copied to a target location. In such a case, the xcopy command may be received by a mapped LUN driver of a storage system which sends information regarding the xcopy command to a file system mapping driver of the storage system. The file system mapping driver includes logic for maintaining a LUN as a file system.

Described below are various use cases for copying a source data block to a target data block.

First, if a request is received to copy a source data block to a target data block where contents of the source data block is different than contents of the target data block, the mapping pointer for the target data block included in the VBM object for the target data block is updated to point to the VBM object for the source data block. The target data block is freed if no other data block shares the target data block. The delegated reference count for the target data block is updated if the target data block is shared with any other data block.

Second, if a request is received to copy a source data block to a target data block where the mapping pointer for the target data block indicates a hole and does not refer to any data block representing allocated storage, the mapping pointer for the target data block included in the VBM object for the target data block is updated to point to the VBM object for the source data block. In such a case, there is no data block corresponding to the mapping pointer of the target data block which is required to be freed.

Next, if a request is received to copy a source data block to a target data block where respective mapping pointer for the source and target data blocks indicates a hole and does not refer to any data block representing allocated storage, no copy operation is performed as the source data block does not include any content for copying.

Next, if a request is received to copy a source data block to a target data block where the mapping pointer for the source data block indicates a hole and does not refer to any data block representing allocated storage but the mapping pointer for the target data block points to a valid data block, the mapping pointer for the target data block is changed into a hole such that if the VBM object pointed to by the mapping pointer for the target data block has previously been owned, the VBM object is freed. Further, in such a case, if the data block pointed to by the VBM object that has been freed has previously been owned by the VBM object, the data block is freed as well. Thus, the target data block is freed if the target data block is not shared with any other data block. The delegated reference count for the target data block is updated if the target data block is shared with any other data block.

Next, if a request is received to copy a source data block to a target data block where the mapping pointer for the source data block points to a data block but the mapping pointer for the target data block points to a data block including invalid contents (also referred to herein as "bad block"), the mapping pointer for the target data block included in the VBM object for the target data block is updated to point to the VBM object for the source data block which indicates a valid data block. Thus, a bad block is considered a hole for the purposes of copying data.

Next, if a request is received to copy a source data block to a target data block where the mapping pointer for the target data block points to a data block but the mapping pointer for the source data block points to a bad data block, the mapping pointer for the target data block is changed into a bad block such that if the VBM object pointed to by the mapping pointer for the target data block has previously been owned, the VBM object is freed. Further, in such a case, if the data block pointed to by the VBM object that has been freed has previously been owned by the VBM object, the data block is freed as well. Thus, the target data block is freed if the target data block is not shared with any other data block. The delegated reference count for the target data block is updated if the target data block is shared with any other data block.

Next, if a request is received to copy a source data block to a target data block where the mapping pointer for the source data block points a bad data block and the mapping pointer for the target data block does not points to a hole, the mapping pointer for the target data block is changed into a bad block such that if the VBM object pointed to by the mapping pointer for the target data block has previously been owned, the VBM object is freed. Further, in such a case, if the data block pointed to by the VBM object that has been freed has previously been owned by the VBM object, the data block is freed as well.

Next, if a request is received to copy a source data block to a target data block where the mapping pointer for both the source and target data blocks points to a bad data block, no copying operation is performed as both source and target data blocks points to an invalid data block.

Next, if a request is received to copy a source data block to a target data block where the mapping pointer for target data block points to the VBM object for the source data block indicating that the source and target data blocks have been deduplicated previously, no copying operation is performed as both source and target data blocks points to an identical data block.

Figure 9:
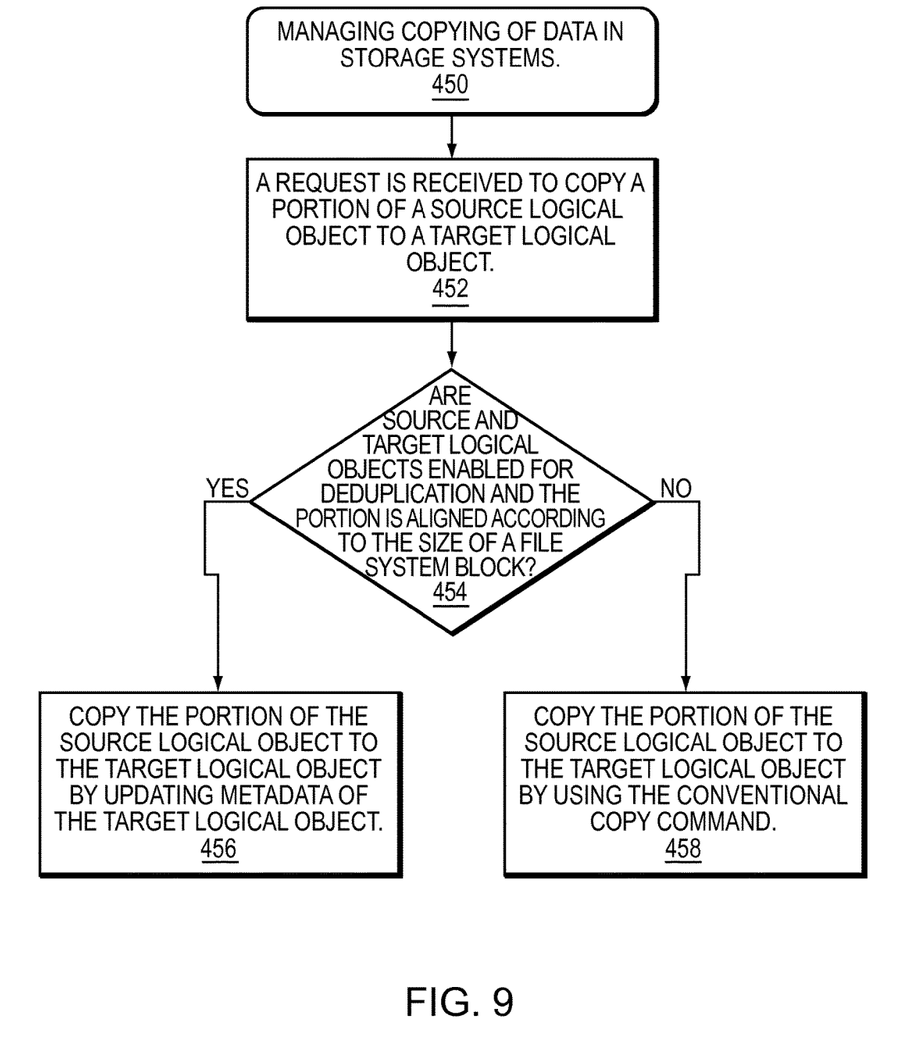
FIG. 9 is a flow diagram illustrating processes that may be used in connection with techniques herein.

Referring to FIG. 9, shown is a more detailed flow diagram illustrating managing copying of data in storage systems. With reference also to FIGS. 7-8, copying of data in storage systems is managed in a storage system (step 450). A request is received to copy a portion of a source logical object to a target logical object (452). It should be noted that the source logical object may be same as the target logical object. A determination is made as to whether the source and target logical objects are enabled for deduplication such that a deduplication technique may be applied to the source and target logical objects (step 454). Another determination is made as to whether the portion selected for copying data is aligned based on the size of a file system block configured on the storage system. If the source and target logical objects are enabled for deduplication and the portion aligns with the size of a file system block, the portion of the source logical object is copied to the target logical object by updating metadata such as respective VBM objects of a set of data blocks corresponding to the portion of the target logical object selected for copying (step 456). However, if the source and target logical objects are not enabled for deduplication or the portion does not align with the size of a file system block, the conventional copying technique may be used which copies contents of the portion of the source logical object to the target logical object (step 458).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing copying of data in storage systems, the method comprising:
receiving a request to perform a copy operation on a portion of a source logical object for copying contents of the portion of the source logical object to a portion of a target logical object, wherein the copy operation provides an offset within the source logical object and a length of data for copying the portion of the source logical object that starts at the offset, wherein a portion of a logical object includes a set of data blocks;
determining whether the source and target logical objects are enabled for applying a deduplicating technique;
determining whether the portion of the source logical object is aligned based on a size of a data block configured on a storage system; and
based on the determining whether the source and target logical objects are enabled for applying the deduplicating technique, performing the copy operation on the portion of the source logical object for copying the contents of the portion of the source logical object to the portion of the target logical object, wherein the copy operation is performed on the portion of the source logical object by sharing a set of data blocks associated with the portion of the source logical object with the portion of the target logical object by updating metadata associated with the portion of the target logical object to refer to the portion of the source logical without having to copy the contents of the portion of the source logical object to the portion of the target logical object and without having to interact with a deduplication system upon determining that the source and target logical objects are enabled for applying the deduplicating technique and the portion of the source logical object aligns with the size of a data block configured on the storage system, wherein updating the metadata includes updating mapping pointers associated with a set of data blocks associated with the portion of the target logical object, wherein a mapping pointer is associated with a data block, wherein the mapping pointer includes a distributed weight indicating whether the data block has been shared.

2. The method of claim 1, wherein the source and target logical objects are selected from the group consisting of a deduplication domain, a storage extent, a LUN, a file and a data block, wherein the data Hock is a fixed size chunk of a physical disk storage.

3. The method of claim 1, wherein a deduplication domain comprises a set of storage extents, wherein each storage extent of the set of storage extents comprises a set of LUNs, each LUN of the set of LUNs is a logical representation of a subset of physical disk storage.

4. The method of claim 1, wherein a mapping pointer for a data block points to a Virtual Block Mapping object, wherein the Virtual Block Mapping object includes another mapping pointer to refer to a data block and a total distributed weight indicating whether the Virtual Block Mapping object has been shared.

5. The method of claim 1, wherein the portion of the source logical object ncludes a set of source file system blocks and the target logical object includes a set of target file system blocks, wherein each source file system block of the set of source file system blocks is copied to respective target file system block of the set of target file system blocks.

6. The method of claim 5, wherein copying a source file system block of the set of source file system blocks to a target file system block of the set of target file system blocks further comprising:
 updating a Virtual Block Mapping object referred to by a mapping pointer of the target system block by changing a mapping pointer included in the Virtual Block Mapping object to point to a Virtual Block Mapping object referred to by a mapping pointer of the source file system block;
 determining whether the target file system block has been shared; and
 based on the determination, freeing the target file system block.

7. The method of claim 6, further comprising:
 updating a total distributed weight of the Virtual Block Mapping object referred to by the mapping pointer of the source file system Hock.

8. A system for use in managing copying of data in storage systems, the system comprising a processor configured to:
 receive a request to perform a copy operation on a portion of a source logical object for copying contents of the portion of the source logical object to a portion of a target logical object, wherein the copy operation provides an offset within the source logical object and a length of data for copying the portion of the source logical object that starts at the offset, wherein a portion of a logical object includes a set of data blocks;
 determine whether the source and target logical objects are enabled for applying a deduplicating technique;
 determine whether the portion of the source logical object is aligned based on a size of a data block configured on a storage system; and
 based on the determining whether the source and target logical objects are enabled for applying the deduplicating technique, perform the copy operation on the portion of the source logical object for copying the contents of the portion of the source logical object to the portion of the target logical object, wherein the copy operation is performed on the portion of the source logical object by sharing a set of data blocks associated with the portion of the source logical object with the portion of the target logical object by updating metadata associated with the portion of the target logical object to refer to the portion of the source logical object without having to copy the contents of the portion of the source logical object to the portion of the target logical object and without having to interact with a deduplication system upon determining that the source and target logical objects are enabled for applying the deduplicating technique and the portion of the source logical object aligns with the size of a data block configured on the storage system, wherein updating the metadata includes updating mapping pointers associated with a set of data blocks associated with the portion of the target logical object, wherein a mapping pointer is associated with a data block, wherein the mapping pointer includes a distributed weight indicating whether the data block has been shared.

9. The system of claim 8, wherein the source and target logical objects are selected from the group consisting of a deduplication domain, a storage extent, a LUN, a file and a data block, wherein the data block is a fixed size chunk of a physical disk storage.

10. The system of claim 8, wherein a deduplication domain comprises a set of storage extents, wherein each storage extent of the set of storage extents comprises a set of LUNs, each LUN of the set of LUNs is a logical representation of a subset of physical disk storage.

11. The system of claim 8, wherein a mapping pointer for a data block points to a Virtual Block Mapping object, wherein the Virtual Block Mapping object includes another mapping pointer to refer to a data block and a total distributed weight indicating whether the Virtual Block Mapping object has been shared.

12. The system of claim 8, wherein the portion of the source logical object includes a set of source file system blocks and the target logical object includes a set of target file system blocks, wherein each source file system block of the set of source file system blocks is copied to respective target file system block of the set of target file system blocks.

13. The system of claim 12, wherein copying a source file system block of the set of source file system Hocks to a target file system block of the set of target file system Hocks further comprising:
 update a Virtual Block Mapping object referred to by a mapping pointer of the target file system block by changing a mapping pointer included in the Virtual Block Mapping object to point to a Virtual Block Mapping object referred to by a mapping pointer of the source file system block;
 determine whether the target file system block has been shared; and
 based on the determination, free the target file system block.

14. The system of claim 13, further comprising:
 update a total distributed weight of the Virtual Block Mapping object referred to by the mapping pointer of the source file system block.

\* \* \* \* \*